(12) United States Patent
Sawa et al.

(10) Patent No.: US 10,538,257 B2
(45) Date of Patent: Jan. 21, 2020

(54) AIR SPRING AND BOGIE

(71) Applicants: Sumitomo Electric Industries, Ltd., Osaka-shi, Osaka (JP); Kawasaki Jukogyo Kabushiki Kaisha, Kobe-shi, Hyogo (JP)

(72) Inventors: Takayuki Sawa, Osaka (JP); Hideki Kitada, Osaka (JP); Yasuhiko Ura, Osaka (JP)

(73) Assignees: Sumitomo Electric Industries, Ltd., Osaka-shi, Osaka (JP); Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 265 days.

(21) Appl. No.: 15/525,987

(22) PCT Filed: Oct. 17, 2016

(86) PCT No.: PCT/JP2016/080699
§ 371 (c)(1),
(2) Date: May 11, 2017

(87) PCT Pub. No.: WO2018/073864
PCT Pub. Date: Apr. 26, 2018

(65) Prior Publication Data
US 2018/0312174 A1    Nov. 1, 2018

(51) Int. Cl.
*B61F 5/10* (2006.01)

(52) U.S. Cl.
CPC ..................... *B61F 5/10* (2013.01)

(58) Field of Classification Search
CPC ...... B61F 5/00; B61F 5/02; B61F 5/10; B61F 5/12; B61F 5/14; F16F 9/00; F16F 9/04; F16F 9/05; F16F 9/06; F16F 9/08
See application file for complete search history.

(56) References Cited

FOREIGN PATENT DOCUMENTS

| JP | 2000-35075 | * | 2/2000 | ............... F16F 9/05 |
|---|---|---|---|---|
| JP | 2000-035075 | A | 2/2000 | |
| JP | 2012-17769 | A | 1/2012 | |
| JP | 2013-241989 | A | 12/2013 | |
| JP | 2016-125539 | A | 7/2016 | |

* cited by examiner

*Primary Examiner* — Robert J McCarry, Jr.
(74) *Attorney, Agent, or Firm* — Drinker Biddle & Reath LLP

(57) ABSTRACT

An air spring according to the present disclosure includes: an inner cylindrical member; an outer cylindrical member provided on the inner cylindrical member; a diaphragm coupled with the outer cylindrical member and the inner cylindrical member; and a stopper provided rotatably with respect to a circumferential direction of the inner cylindrical member. The stopper has a raised portion raised towards the outer cylindrical member and moving on the inner cylindrical member in the circumferential direction. The outer cylindrical member has a plurality of raised portions raised toward the inner cylindrical member. The plurality of raised portions of the outer cylindrical member are different in height. At least one of the outer cylindrical member's raised portion and the stopper's raised portion is restorable against circumferential deformation.

8 Claims, 10 Drawing Sheets

AIR SPRING AND BOGIE

TECHNICAL FIELD

The present invention relates to an air spring and a bogie.

BACKGROUND ART

Japanese Patent Laying-Open No. 2000-35075 (patent document 1) discloses an air spring comprising an inner cylindrical member, an outer cylindrical member, a bellows disposed between the inner cylindrical member and the outer cylindrical member, and a stopper provided rotatably relative to the inner cylindrical member. In the air spring described in patent document 1, the outer cylindrical member is provided with a plurality of surfaces to be supported different in height. In the air spring described in patent document 1, the stopper is provided with a raised portion supported by the inner cylindrical member.

Japanese Patent Laying-Open No. 2012-17769 (patent document 2) discloses an air spring comprising an upper supporting portion, a lower supporting portion, and a diaphragm disposed between the upper supporting portion and the lower supporting portion. In the air spring described in patent document 2, the upper supporting portion is provided with an upper stopper member. In the air spring described in patent document 2, a movable lower stopper member is provided on the lower supporting portion.

CITATION LIST

Patent Documents

[Patent document 1] Japanese Patent Laying-Open No. 2000-35075
[Patent document 2] Japanese Patent Laying-Open No. 2012-17769

SUMMARY OF INVENTION

An air spring according to the present disclosure comprises: an inner cylindrical member; an outer cylindrical member provided on the inner cylindrical member; a diaphragm coupled with the outer cylindrical member and the inner cylindrical member; and a stopper provided rotatably with respect to a circumferential direction of the inner cylindrical member.

The stopper has a raised portion raised towards the outer cylindrical member and moving on the inner cylindrical member in the circumferential direction by rotating the stopper in the circumferential direction. The outer cylindrical member has a plurality of raised portions raised toward the inner cylindrical member. The outer cylindrical member's raised portions are different in height. At least one of the outer cylindrical member's raised portion and the stopper's raised portion is restorable against deformation caused in a direction perpendicular to a direction from the outer cylindrical member toward the inner cylindrical member.

DESCRIPTION OF EMBODIMENTS

Figure 1:
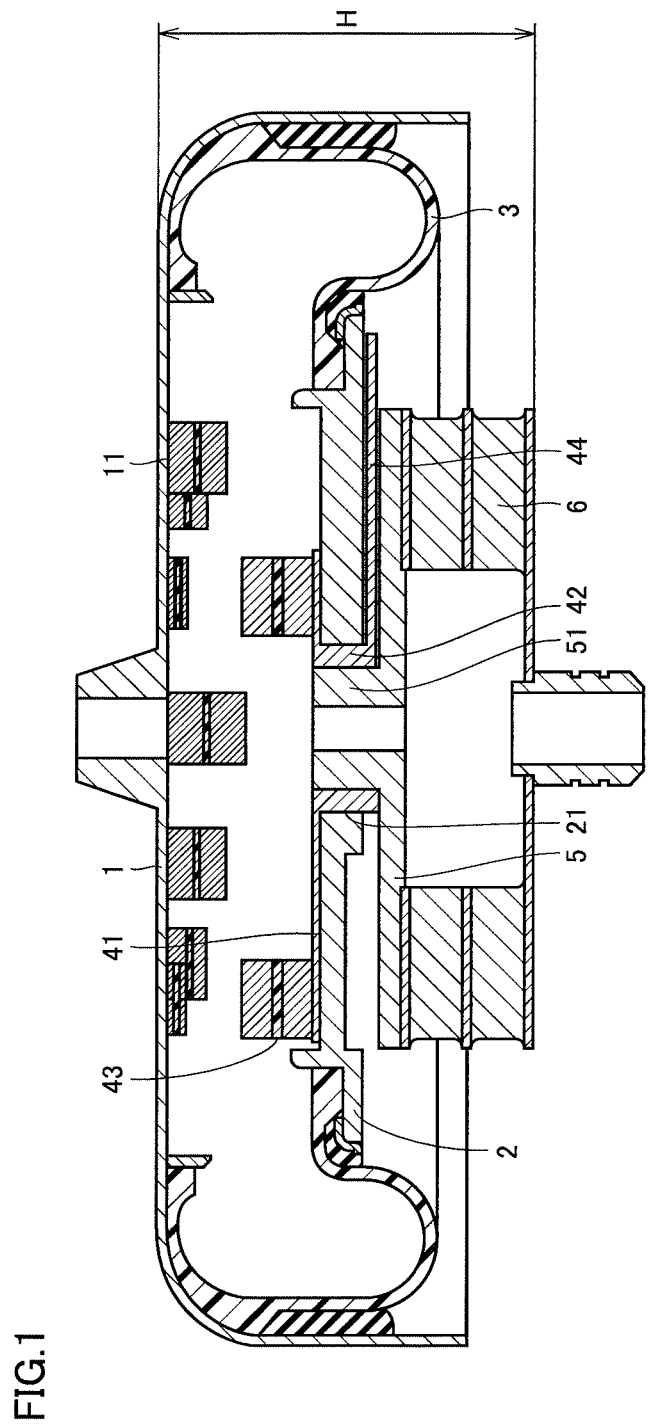
FIG. 1 is a cross section of an air spring according to a first embodiment.

Issue to be Addressed by the Present Disclosure

For example, in the air spring described in patent document 1, while the air spring is in use, the outer cylindrical member moves up and down with respect to the inner cylindrical member to attenuate vibration. This vertical movement of the outer cylindrical member is restricted by supporting a surface to be supported by the raised portion. However, the air spring described in patent document 1 may experience a vibration in a direction perpendicular to a direction from the outer cylindrical member toward the inner cylindrical member, such as a vibration rotating/horizontally moving the outer cylindrical member relative to the inner cylindrical member. In that case, there is a possibility that a side surface of the surface to be supported and a side surface of the raised portion may collide with each other. A result of this collision, there is a possibility that the surface to be supported or the raised portion may be damaged.

Effect of Present Disclosure

The air spring according to the present disclosure is resistant to damage when the air spring experiences a vibration in a direction perpendicular to a direction from the outer cylindrical member to the inner cylindrical member.

Description of Embodiment of Present Disclosure

Initially, embodiments of the present disclosure will be enumerated and specifically described.

(1) An air spring according to one aspect of an embodiment of the present disclosure comprises: an inner cylindrical member; an outer cylindrical member provided on the inner cylindrical member; a diaphragm coupled with the outer cylindrical member and the inner cylindrical member; and a stopper provided rotatably with respect to a circumferential direction of the inner cylindrical member.

The stopper has a raised portion raised towards the outer cylindrical member and moving on the inner cylindrical member in the circumferential direction. The outer cylindrical member has a plurality of raised portions raised toward the inner cylindrical member. The plurality of raised portions of the outer cylindrical member are different in height. At least one of the outer cylindrical member's raised portion and the stopper's raised portion is restorable against deformation caused in a direction from the outer cylindrical member toward the inner cylindrical member.

According to the air spring of item (1), even when a vibration or the like in a direction perpendicular to a direction from the outer cylindrical member toward the inner cylindrical member brings the outer cylindrical member's raised portion and the stopper's raised portion into contact with each other, damaging the outer cylindrical member's raised portion or the stopper's raised portion can be suppressed.

(2) In the air spring according to item (1), at least one of the outer cylindrical member's raised portion and the stopper's raised portion may have a flexible layer between a bottom surface thereof and a top surface thereof.

According to the air spring of item (2), even when the outer cylindrical member rotates or horizontally moves relative to the inner cylindrical member and the outer cylindrical member's raised portion and the stopper's raised portion contact each other, damaging the outer cylindrical member's raised portion or the stopper's raised portion can be suppressed.

(3) In the air spring according to item (2), a metal layer may be provided and the metal layer and the flexible layer may be stacked in layers.

According to the air spring of item (3), while ensuring that the outer cylindrical member's raised portion or the stopper's raised portion is rigid in a direction in which it is compressed, even when the outer cylindrical member rotates or horizontally moves relative to the inner cylindrical member and the outer cylindrical member's raised portion and the stopper's raised portion contact each other, damaging the outer cylindrical member's raised portion or the stopper's raised portion can be suppressed.

(4) In the air spring according to item (2) or (3), the flexible layer may be formed of an elastomer.

According to the air spring of item (4), even when the outer cylindrical member rotates or horizontally moves relative to the inner cylindrical member and the outer cylindrical member's raised portion and the stopper's raised portion contact each other, damaging the outer cylindrical member's raised portion or the stopper's raised portion can be suppressed.

(5) In the air spring of item (4), the elastomer may be a rubber material.

According to the air spring of item (5), even when the outer cylindrical member rotates or horizontally moves relative to the inner cylindrical member and the outer cylindrical member's raised portion and the stopper's raised portion contact each other, damaging the outer cylindrical member's raised portion or the stopper's raised portion can be suppressed.

(6) In the air spring according to items (1) to (5), the plurality of raised portions of the outer cylindrical member may be arranged in the circumferential direction in an order in height.

According to the air spring of item (6), facilitating a height adjustment and preventing the outer cylindrical member's raised portion or the stopper's raised portion from being easily damaged can be coestablished.

(7) In the air spring according to items (1) to (6), the stopper may have a plurality of raised portions, the outer cylindrical member may have a plurality of sets of raised portions, and the number of sets may be equal to the number of raised portions of the stopper.

According to the air spring of item (7), both reliably restricting a vertical movement of the outer cylindrical member relative to the inner cylindrical member and preventing the outer cylindrical member's raised portion or the stopper's raised portion from being easily damaged can be coestablished.

(8) An air spring according to one aspect of an embodiment of the present disclosure comprises: an inner cylindrical member; an outer cylindrical member provided on the inner cylindrical member; a diaphragm coupled with the outer cylindrical member and the inner cylindrical member; and a stopper provided rotatably with respect to a circumferential direction of the inner cylindrical member. The stopper has a raised portion raised towards the outer cylindrical member and moving on the inner cylindrical member in the circumferential direction. The outer cylindrical member has a raised portion raised toward the inner cylindrical member, at least one of the outer cylindrical member's raised portion and the stopper's raised portion has a flexible layer and a metal layer, and the metal layer is stacked on the flexible layer.

According to the air spring of item (8), the outer cylindrical member's movement toward the inner cylindrical member can be sufficiently restricted while damaging the outer cylindrical member's raised portion and the stopper's raised portion is suppressed.

(9) A bogie according to one aspect of the present disclosure comprises the air spring of items (1) to (7).

According to the bogie of item (9), damaging the air spring can be suppressed even when a vibration is experienced in a direction perpendicular to a direction from the outer cylindrical member to the inner cylindrical member.

Details of Embodiments of the Present Disclosure

Hereinafter reference will be made to the drawings to describe embodiments of the present disclosure more specifically. In the figures, identical or corresponding components are identically denoted. Furthermore, the embodiments described below may have at least their portions combined together as desired. Furthermore, in the drawings, length, width, thickness, depth and other dimensional relationships are changed as appropriate for clarification of the drawings, and do not represent actual dimensional relationships.

First Embodiment

Hereinafter, a general configuration of an air spring according to a first embodiment will be described.

FIG. 1 is a cross section of an air spring according to the first embodiment. As shown in FIG. 1, an air spring according to the first embodiment comprises an outer cylindrical member 1, an inner cylindrical member 2, a diaphragm 3 and a stopper 4. Furthermore, the air spring according to the first embodiment has a lower plate 5 and laminated rubber 6.

Outer cylindrical member 1 and inner cylindrical member 2 are disposed such that one overlaps the other. In other words, outer cylindrical member 1 is disposed over inner cylindrical member 2. A raised portion 11 of the outer cylindrical member is provided on a surface of outer cylindrical member 1 that faces inner cylindrical member 2. The outer cylindrical member's raised portion 11 is raised toward inner cylindrical member 2. A configuration of the outer cylindrical member's raised portion 11 will specifically be described later.

Inner cylindrical member 2 has a hole 21. Hole 21 is provided at a center of inner cylindrical member 2. Lower plate 5 has a cylindrical axial portion 51. Cylindrical axial portion 51 is provided at a center of lower plate 5 on a side attached to inner cylindrical member 2. Cylindrical axial portion 51 is inserted in hole 21. Inner cylindrical member 2 is fastened to lower plate 5 for example with a bolt and a nut. Thus, inner cylindrical member 2 is attached to lower plate 5.

Lower plate 5 is attached to laminated rubber 6 on a side of lower plate 5 opposite to a side thereof having inner cylindrical member 2 attached thereto. Note that although it is not shown, laminated rubber 6 is attached to a bogie of a railway vehicle. A distance from that side of laminated rubber 6 attached to a bogie of a railway vehicle to the outer cylindrical member, i.e., a height of the air spring according to the first embodiment, is represented as by H.

Diaphragm 3 is coupled with outer cylindrical member 1 and inner cylindrical member 2. Diaphragm 3, and outer cylindrical member 1 and inner cylindrical member 2 are coupled hermetically. Thus, a space defined by outer cylindrical member 1, inner cylindrical member 2 and diaphragm 3 is filled with air. Rubber or the like is used for diaphragm 3 for example.

Figure 2:
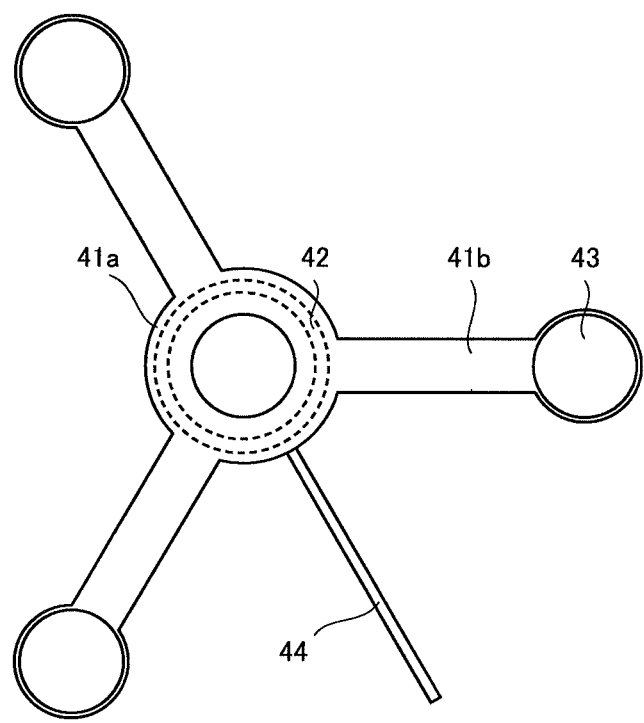
FIG. 2 is a top view of a stopper.

FIG. 2 is a top view of stopper 4. As shown in FIG. 2, stopper 4 has a base 41, cylindrical portion 42, and a raised portion 43 of the stopper. Base 41 is in the form of a flat plate.

Base 41 has a center portion 41a and a branch portion 41b. Center portion 41a has an annular shape in a plan view. Branch portion 41b radially extends from an outer periphery of center portion 41a. One or more branch portions 41b are provided. Preferably, a plurality of branch portions 41b are provided. When a plurality of branch portions 41b are provided, branch portions 41b are equal in length. When a plurality of branch portions 41b are provided, the plurality of branch portion 41b are equally spaced. In FIG. 2, branch portions 41b are spaced from each other by 120 degrees and thus provided at three locations. Note that the number of branch portions 41b is not limited thereto.

As shown in FIG. 1, cylindrical portion 42 is provided on the side of a lower surface of center portion 41a. The stopper's raised portion 43 is provided on the side of an upper surface of branch portion 41b. The stopper's raised portion 43 has a shape raised toward outer cylindrical member 1. As has been discussed above, since one or more branch portions 41b are provided, the stopper also has one or more raised portions 43. When the stopper has a plurality of raised portions 43, the stopper's raised portions 43 are equal in height. Note that a configuration of the stopper's raised portion 43 will specifically be described later.

Cylindrical portion 42 is inserted between an internal wall surface of hole 21 and a radially outer surface of cylindrical axial portion 51. More specifically, a radially inner surface of cylindrical portion 42 and the radially outer surface of cylindrical axial portion 51 face each other, and a radially outer surface of cylindrical portion 42 and the internal wall surface of hole 21 face each other. Thus, branch portion 41b of stopper 4 and the stopper's raised portion 43 provided on branch portion 41b will be positioned on inner cylindrical member 2.

A lever 44 is attached to cylindrical portion 42. Lever 44 is externally drawn out between inner cylindrical member 2 and lower plate 5. Thus, stopper 4 can be rotated in a circumferential direction of inner cylindrical member 2. By rotating stopper 4 in the circumferential direction of inner cylindrical member 2, the stopper's raised portion 43 located on inner cylindrical member 2 moves in the circumferential direction of inner cylindrical member 2. Note that although it is not shown, the position of stopper 4 can be fixed at a position at which the stopper's raised portion 43 and the outer cylindrical member's raised portion 11 face each other.

A configuration of the outer cylindrical member's raised portion 11 and the stopper's raised portion 43 of the air spring according to the first embodiment will more specifically be described below.

Figure 3:
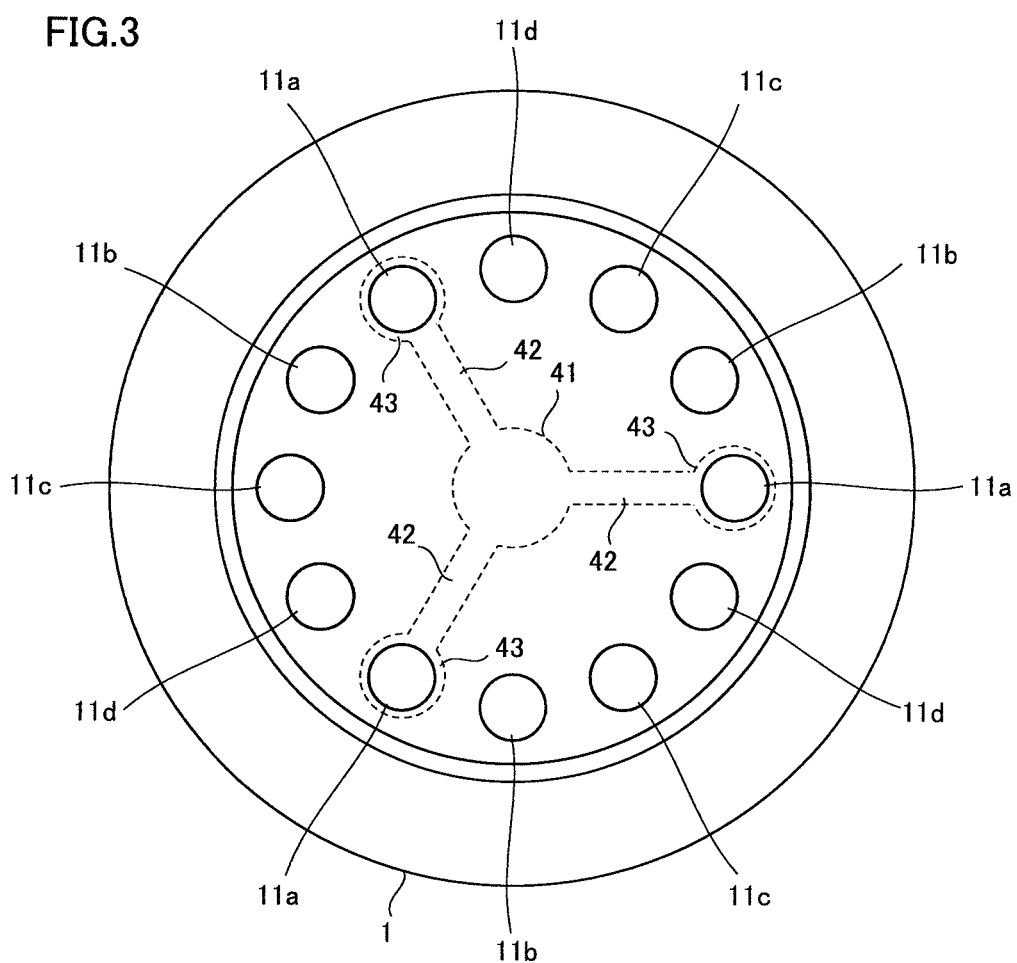
FIG. 3 is a top view of an outer cylindrical member observed on the side of an inner cylindrical member.

FIG. 3 is a top view of outer cylindrical member 1 observed on the side of inner cylindrical member 2. In FIG. 3, a dotted line indicates a shape of stopper 4 for reference. As shown in FIG. 3, outer cylindrical member 1 has a plurality of raised portions 11 on a surface of outer cylindrical member 1 facing inner cylindrical member 2. The plurality of raised portions 11 of the outer cylindrical member are arranged annularly. The plurality of raised portions 11 of the outer cylindrical member are provided at a position such that when outer cylindrical member 1 is disposed on inner cylindrical member 2 the outer cylindrical member's raised portions 11 face the stopper's raised portion 43 as stopper 4 is rotated.

The plurality of raised portions 11 of the outer cylindrical member are different in height. Furthermore, the plurality of raised portions 11 of the outer cylindrical member are arranged successively in the circumferential direction of inner cylindrical member 2. Such a plurality of raised portions 11 of the outer cylindrical member is a single set. There may be provided a plurality of sets each of the plurality of raised portions 11 of the outer cylindrical member. Note that each set has its raised portions 11 of the outer cylindrical member in the same arrangement. Preferably, four or more raised portions 11 of the outer cylindrical member belong to each set.

Preferably, the number of the sets is equal to the number of the stopper's raised portions 43. As has been set forth above, each set has its raised portions 11 of the outer cylindrical member in the same arrangement, so that when the stopper has a plurality of raised portions 43, and the number of sets is equal to the number of raised portions of the stopper, the stopper's raised portions 43 will face a plurality of raised portions 11 of the outer cylindrical member equal in height.

Hereinafter a case will be described in which there are configured three sets each of a plurality of raised portions 11 of the outer cylindrical member and each of the three sets is composed of four raised portions 11 of the outer cylindrical member different in height (i.e., the outer cylindrical member's raised portions 11a, 11b, 11c, and 11d).

Figure 4:
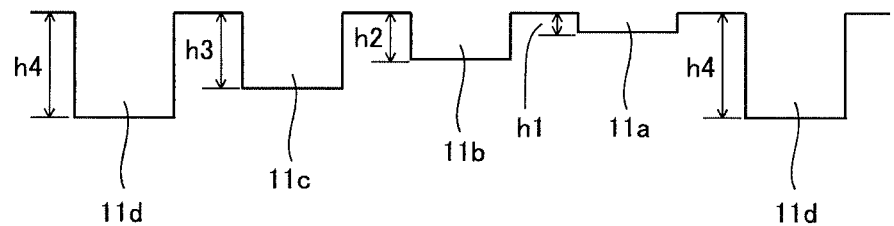
FIG. 4 is a schematic diagram showing an arrangement of the outer cylindrical member's raised portions.

FIG. 4 is a schematic diagram showing a relationship in height of raised portions 11a, 11b, 11c, and 11d of the outer cylindrical member. As shown in FIG. 4, the outer cylindrical member's raised portion 11a is smallest in height. The outer cylindrical member's raised portion 11b is second smallest in height. The outer cylindrical member's raised portion 11c is third smallest in height. The outer cylindrical member's raised portion 11d is largest in height. More specifically, the outer cylindrical member's raised portion 11a has a height h1, the outer cylindrical member's raised portion 11b has a height h2, the outer cylindrical member's raised portion 11c has a height h3, and the outer cylindrical member's raised portion 11*d* has a height h4, and a relationship of height h1<height h2<height h3<height h4 is satisfied.

Note that a difference between height h1 and height h2, a difference between height h2 and height h3, and a difference between height h3 and height h4 correspond to a diameter of a vehicular wheel of a vehicle to which the air spring according to the first embodiment is attached when the vehicular wheel's tread is polished.

Preferably, the outer cylindrical member's raised portions 11*a*, 11*b*, 11*c*, and 11*d* are arranged in an order in height. More specifically, the outer cylindrical member's raised portion 11*a* is adjacent to the outer cylindrical member's raised portion 11*b*, the outer cylindrical member's raised portion 11*b* is adjacent to the outer cylindrical member's raised portion 11*c*, and the outer cylindrical member's raised portion 11*c* is adjacent to the outer cylindrical member's raised portion 11*d*. Note that when this arrangement is done, the outer cylindrical member's raised portion 11*d* will be adjacent to the outer cylindrical member's raised portion 11*a* belonging to another set.

When this is represented from a different point of view, there will be a portion in which the outer cylindrical member's raised portion 11 smallest in height (i.e., the outer cylindrical member's raised portion 11*a*) is adjacent to the outer cylindrical member's raised portion 11 largest in height (i.e., the outer cylindrical member's raised portion 11*d*).

Figure 5A:
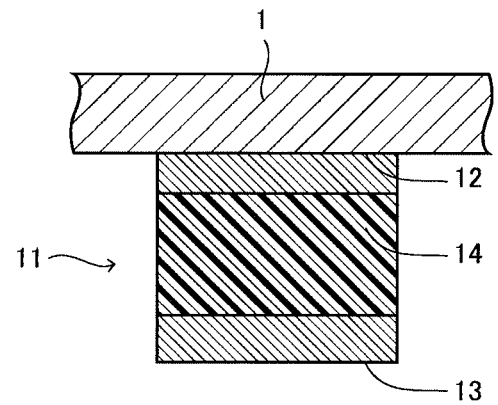
FIG. 5A is an enlarged cross section of the outer cylindrical member's raised portion.

FIG. 5A is an enlarged cross section of the outer cylindrical member's raised portion 11. The outer cylindrical member's raised portion 11 has a bottom surface 12 and a top surface 13. Bottom surface 12 is a surface closer to outer cylindrical member 1. Top surface 13 is a surface of opposite to bottom surface 12. The outer cylindrical member's raised portion 11 has a flexible layer 14. Flexible layer 14 is disposed between bottom surface 12 and top surface 13. Flexible layer 14 is preferably disposed in contact with bottom surface 12. Preferably, flexible layer 14 is provided parallel to bottom surface 12 or top surface 13.

Flexible layer 14 is a layer having flexibility. Elastomer is used for flexible layer 14 for example. Rubber is used for this elastomer, for example. A portion of the outer cylindrical member's raised portion 11 other than flexible layer 14 is composed for example of metal.

When this is represented from a different point of view, flexible layer 14 has an elastic limit higher and an elastic modulus lower than the portion of the outer cylindrical member's raised portion 11 other than flexible layer 14 does.

Figure 5B:
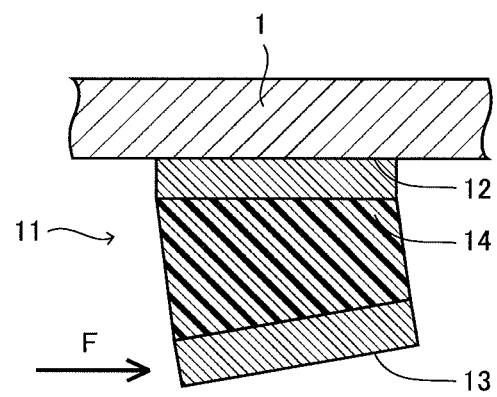
FIG. 5B shows a manner of deformation of the outer cylindrical member's raised portion.

FIG. 5B shows a manner of deformation of the outer cylindrical member's raised portion 11 when force F acts in a direction perpendicular to a direction from outer cylindrical member 1 toward inner cylindrical member 2. As has been discussed above, flexible layer 14 has a low elastic modulus. Accordingly, as shown in FIG. 5B, when force F acts in a direction perpendicular to the direction from outer cylindrical member 1 toward inner cylindrical member 2 (as indicated in the figure by an arrow), flexible layer 14 mainly deforms and the outer cylindrical member's raised portion 11 deforms in a direction perpendicular to the direction from outer cylindrical member 1 toward inner cylindrical member 2. However, as has been discussed above, flexible layer 14 has an elastic limit larger than that of the portion other than flexible layer 14. Accordingly, the outer cylindrical member's raised portion 11 can be restored against deformation caused in the direction perpendicular to the direction from outer cylindrical member 1 toward inner cylindrical member 2.

Figure 6:
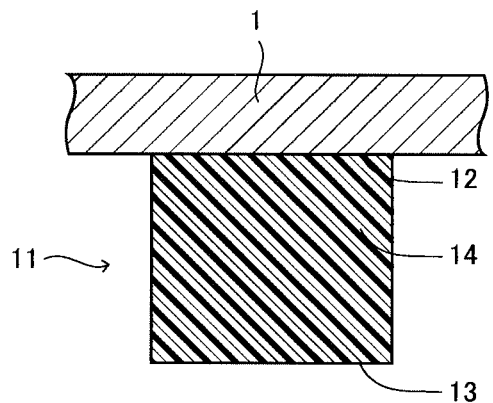
FIG. 6 is an enlarged cross section of the outer cylindrical member's raised portion in a first exemplary variation.

Note that the configuration of the outer cylindrical member's raised portion 11 is not limited thereto. FIG. 6 is an enlarged cross section of the outer cylindrical member's raised portion 11 in a first exemplary variation. As shown in FIG. 6, the outer cylindrical member's raised portion 11 may be entirely composed of an elastomer. More specifically, the outer cylindrical member's raised portion 11 between bottom surface 12 and top surface 13 may entirely be flexible layer 14. Such a configuration also allows the outer cylindrical member's raised portion 11 to be restorable against deformation caused in the direction perpendicular to the direction from outer cylindrical member 1 toward inner cylindrical member 2.

Figure 7:
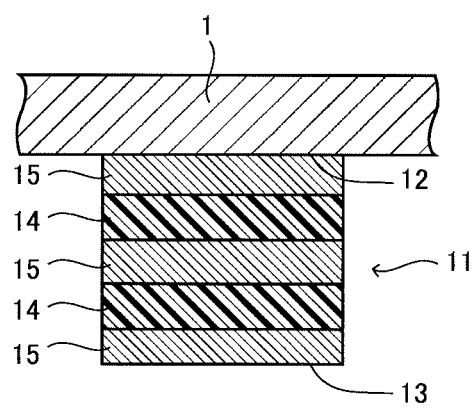
FIG. 7 is an enlarged cross section of the outer cylindrical member's raised portion in a second exemplary variation.

FIG. 7 is an enlarged cross section of the outer cylindrical member's raised portion 11 in a second exemplary variation. As shown in FIG. 7, the outer cylindrical member's raised portion 11 may have flexible layer 14 and a metal layer 15. Metal layer 15 is stacked on flexible layer 14. Flexible layer 14 and metal layer 15 may be plural in number. Such a configuration also allows the outer cylindrical member's raised portion 11 to be restorable against deformation caused in the direction perpendicular to the direction from outer cylindrical member 1 toward inner cylindrical member 2.

Figure 8:
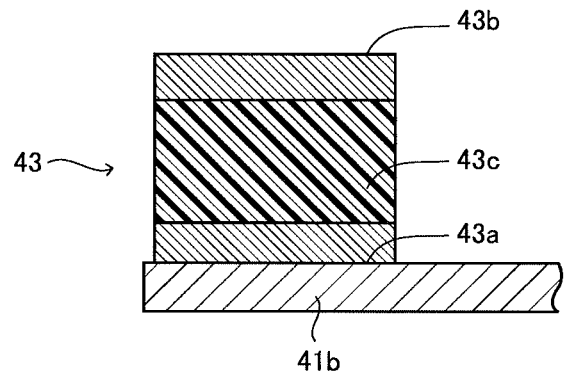
FIG. 8 is an enlarged cross section of the stopper's raised portion.
Figure 9:
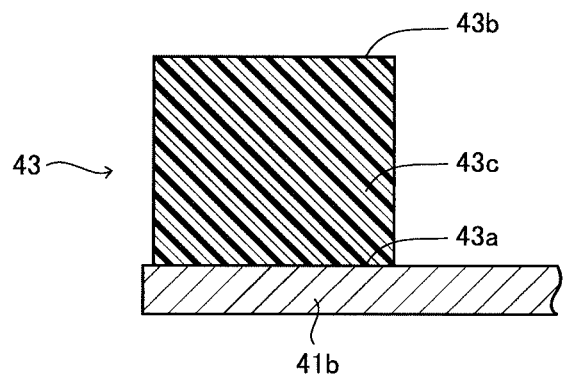
FIG. 9 is an enlarged cross section of the stopper's raised portion in a first exemplary variation.
Figure 10:
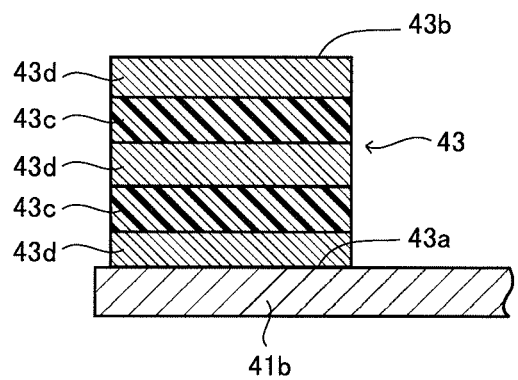
FIG. 10 is an enlarged cross section of the stopper's raised portion in a second exemplary variation.

FIG. 8 is an enlarged cross section of the stopper's raised portion 43. FIG. 9 is an enlarged cross section of a first exemplary variation of the stopper's raised portion 43. FIG. 10 is an enlarged cross section of a second exemplary variation of the stopper's raised portion 43. As shown in FIG. 8, FIG. 9, and FIG. 10, the stopper's raised portion 43 may have a configuration similar to that of the outer cylindrical member's raised portion 11 to be restorable against deformation caused in the direction perpendicular to the direction from outer cylindrical member 1 toward inner cylindrical member 2.

More specifically, the stopper's raised portion 43 has a bottom surface 43*a* and a top surface 43*b*. A flexible layer 43*c* is provided between bottom surface 43*a* and top surface 43*b*. The stopper's raised portion 43 between bottom surface 43*a* and top surface 43*b* may entirely be flexible layer 43*c*. The stopper's raised portion 43 may have a plurality of flexible layers 43*c* and a metal layer 43*d* stacked on the plurality of flexible layers 43*c*.

Note that both the outer cylindrical member's raised portion 11 and the stopper's raised portion 43 may be restorable against deformation caused in the direction perpendicular to the direction from outer cylindrical member 1 toward inner cylindrical member 2, or one of them may be restorable against deformation caused in the direction perpendicular to the direction from outer cylindrical member 1 toward inner cylindrical member 2.

Hereinafter, an operation of the air spring according to the first embodiment will be described.

The air spring according to the first embodiment is attached to a railway vehicle. By rotating stopper 4, the stopper's raised portion 43 is moved to a position facing the outer cylindrical member's raised portion 11*a*. When this is done, height H of the air spring according to the first embodiment is assumed to be a height H1.

When the air spring according to the first embodiment receives vibration from the railway vehicle, outer cylindrical member 1 moves up and down relative to inner cylindrical member 2. As this vertical movement is made, the air filling a space defined by outer cylindrical member 1, inner cylindrical member 2, and diaphragm 3 is compressed and expanded. This attenuates vibration provided from the railway vehicle to the air spring according to the first embodiment.

As has been discussed above, the stopper's raised portion 43 and the outer cylindrical member's raised portion 11a face each other, and accordingly, a vertical stroke width of outer cylindrical member 1 with respect to inner cylindrical member 2 is restricted within a prescribed range. This stroke width of the air spring according to the first embodiment will hereinafter be referred to as a stroke width S.

When a vehicular wheel of a railway vehicle having the air spring according to the first embodiment attached thereto is worn out, it is necessary to polish a tread of the vehicular wheel. The polishing would reduce the railway vehicle's vehicular height. Accordingly, an amount of air filling the air spring according to the first embodiment is increased to make height H a height H2 (a difference between height H1 and height H2 corresponds to an amount in vehicular height reduced as the vehicular wheel is worn and polished) to maintain the railway vehicle's height.

When height H of the air spring according to the first embodiment is made height H2, a spacing between the stopper's raised portion 43 and the outer cylindrical member's raised portion 11a is increased. Accordingly, if the stopper's raised portion 43 and the outer cylindrical member's raised portion 11a remain facing each other, an increased stroke width is provided. Accordingly, stopper 4 is rotated as the amount of air filling the air spring according to the first embodiment is increased. This moves the stopper's raised portion 43 to a position facing the outer cylindrical member's raised portion 11b. As has been discussed above, a difference between height h2 of the outer cylindrical member's raised portion 11b and height h1 of the outer cylindrical member's raised portion 11a corresponds to an amount in vehicular height reduced as the vehicular wheel is polished. Accordingly, after height H is made height H2, stroke width S is maintained.

By repeating such an operation, when the vehicular wheel has a tread further worn and accordingly polished, the railway vehicle's vehicle height is still maintained without removing the air spring according to the first embodiment from the railway vehicle.

Hereinafter, an effect of the air spring according to the first embodiment will be described.

The air spring according to the first embodiment in use has outer cylindrical member 1 moving up and down relative to inner cylindrical member 2 to attenuate a vibration received from a railway vehicle. In addition to such a vertical movement, the air spring according to the first embodiment may receive a vibration from the railway vehicle in a direction perpendicular to a direction from outer cylindrical member 1 toward inner cylindrical member 2. When the air spring according to the first embodiment receives a vibration in the direction perpendicular to the direction from outer cylindrical member 1 toward inner cylindrical member 2, a side surface of the outer cylindrical member's raised portion 11 and a side surface of the stopper's raised portion 43 may collide with each other. As a result of this collision, the outer cylindrical member's raised portion 11 and the stopper's raised portion 43 are subject to deformation in the direction perpendicular to the direction from outer cylindrical member 1 toward inner cylindrical member 2.

However, in the air spring according to the first embodiment, at least one of the outer cylindrical member's raised portion 11 and the stopper's raised portion 43 is restorable with respect to the direction perpendicular to the direction from outer cylindrical member 1 toward inner cylindrical member 2. Accordingly, when a side surface of the outer cylindrical member's raised portion 11 and a side surface of the stopper's raised portion 43 collide with each other and the outer cylindrical member's raised portion 11 and the stopper's raised portion 43 are subject to deformation in the direction perpendicular to the direction from outer cylindrical member 1 toward inner cylindrical member 2, damaging the outer cylindrical member's raised portion 11 and the stopper's raised portion 43 is suppressed.

In a case where the air spring according to the first embodiment is provided with flexible layer 14 between bottom surface 12 and top surface 13 of the outer cylindrical member's raised portion 11 or in a case where flexible layer 43c is provided between bottom surface 43a and top surface 43b of the stopper's raised portion 43, with flexible layer 14 or flexible layer 43c having flexibility, when a side surface of the outer cylindrical member's raised portion 11 and a side surface of the stopper's raised portion 43 collide with each other and the outer cylindrical member's raised portion 11 and the stopper's raised portion 43 are subject to deformation in the direction perpendicular to the direction from outer cylindrical member 1 toward inner cylindrical member 2, restoration to an initial position can be done. Accordingly, in that case, damaging the outer cylindrical member's raised portion 11 and the stopper's raised portion 43 is suppressed.

In the air spring according to the first embodiment, when the outer cylindrical member's raised portion 11 between bottom surface 12 and top surface 13 is entirely composed of flexible layer 14 or the stopper's raised portion 43 between bottom surface 43a and top surface 43b is entirely composed of flexible layer 43c, the outer cylindrical member's raised portion 11 or the stopper's raised portion 43 is larger in elastic deformability. Accordingly, in that case, damaging the outer cylindrical member's raised portion 11 and the stopper's raised portion 43 is further suppressed.

In the air spring according to the first embodiment, when metal layer 15 or 43d is stacked on flexible layer 14 or 43c, the outer cylindrical member's raised portion 11 or the stopper's raised portion 43 is improved in rigidity against vertical compressive deformation. Accordingly, in that case, more reliable restriction of stroke width S can be done.

In the air spring according to the first embodiment, when the outer cylindrical member has a plurality of raised portions 11 arranged in the order of their heights, an adjustment after the vehicular wheel is polished can be done by rotating stopper 4 in a fixed direction sequentially. This facilitates an adjustment after the vehicular wheel is polished.

Thus, when a plurality of raised portions 11 of the outer cylindrical member having different heights are arranged, the outer cylindrical member's raised portion 11 smallest in height (i.e., the outer cylindrical member's raised portion 11a) and the outer cylindrical member's raised portion 11 largest in height (i.e., the outer cylindrical member's raised portion 11d) will be arranged adjacent to each other. As a consequence, when the air spring according to the first embodiment receives a vibration in the direction perpendicular to the direction from outer cylindrical member 1 toward inner cylindrical member 2, a side surface of the outer cylindrical member's raised portion 11 and a side surface of the stopper's raised portion 43 collide with each other and the outer cylindrical member's raised portion 11 and the stopper's raised portion 43 are easily subject to deformation in the direction perpendicular to the direction from outer cylindrical member 1 toward inner cylindrical member 2.

However, as has been discussed above, at least one of the outer cylindrical member's raised portion 11 and the stopper's raised portion 43 is configured to be restorable to its initial position when it is deformed in the direction perpendicular to the direction from outer cylindrical member 1 toward inner cylindrical member 2. This can coestablish both facilitating an adjustment after the vehicular wheel is polished and preventing the outer cylindrical member's raised portion 11 or the stopper's raised portion 43 from being easily damaged.

In the air spring according to the first embodiment, when the stopper has a plurality of raised portions 43, and the number of sets of raised portions 11 of the outer cylindrical member is equal to the number of raised portions 43 of the stopper, a vertical movement of outer cylindrical member 1 relative to inner cylindrical member 2 is restricted at a plurality of locations. This more reliably restricts the vertical movement of outer cylindrical member 1 relative to inner cylindrical member 2.

In that case, the total number of raised portions 11 of outer cylindrical member 1 is increased. More specifically, a spacing between the outer cylindrical member's raised portions 11 is narrowed. As a result, when the air spring according to the first embodiment receives a vibration in the direction perpendicular to the direction from outer cylindrical member 1 toward inner cylindrical member 2, a side surface of the outer cylindrical member's raised portion 11 and a side surface of the stopper's raised portion 43 collide with each other and the outer cylindrical member's raised portion 11 and the stopper's raised portion 43 are easily subject to deformation in the direction perpendicular to the direction from outer cylindrical member 1 toward inner cylindrical member 2.

However, as has been discussed above, at least one of the outer cylindrical member's raised portion 11 and the stopper's raised portion 43 is configured to be restorable to its initial position when it is deformed in the direction perpendicular to the direction from outer cylindrical member 1 toward inner cylindrical member 2. This can coestablish both reliably restricting a vertical movement of outer cylindrical member 1 relative to inner cylindrical member 2 and preventing the outer cylindrical member's raised portion 11 or the stopper's raised portion 43 from being easily damaged.

Second Embodiment

Hereinafter, a configuration of an air spring according to a second embodiment will be described. Note that in the following, a point different from the first embodiment will mainly be described and redundant description will not be repeated.

Figure 11:
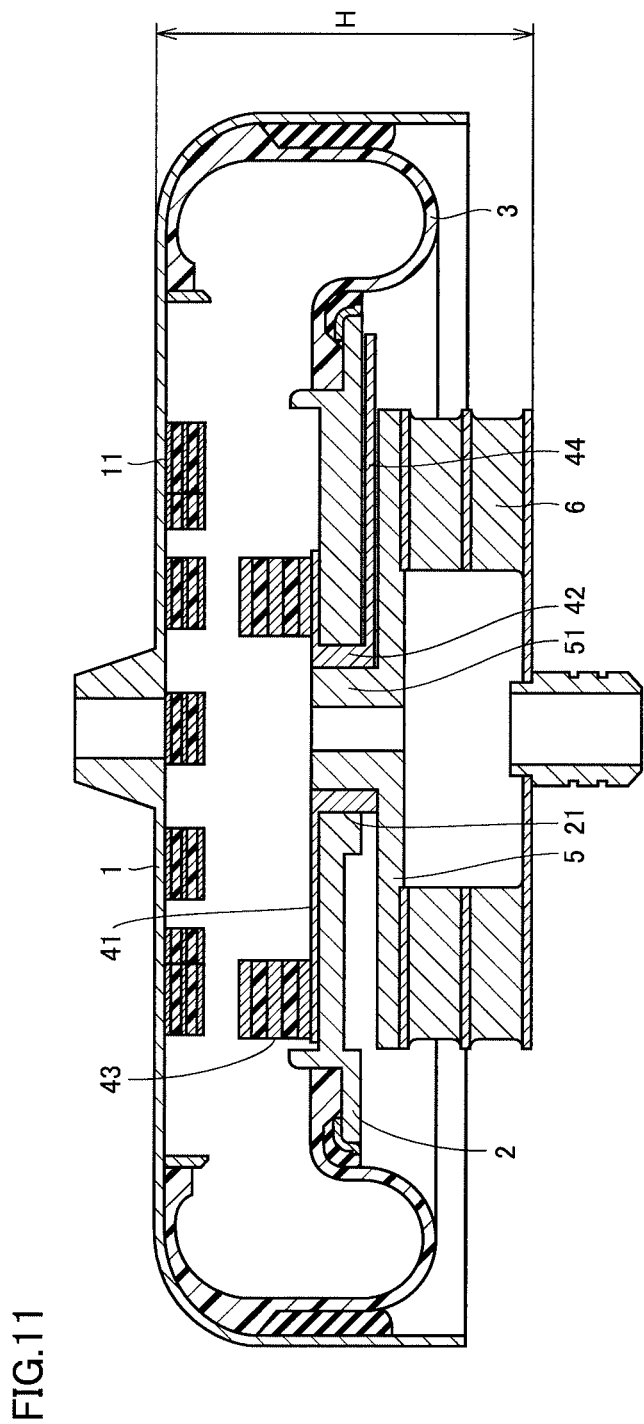
FIG. 11 is a cross section of an air spring according to a second embodiment.

FIG. 11 is a cross section of the air spring according to the second embodiment. As shown in FIG. 11, the air spring according to the second embodiment, as well as the air spring according to the first embodiment, comprises outer cylindrical member 1, inner cylindrical member 2, diaphragm 3 and stopper 4. Furthermore, the air spring according to the second embodiment, as well as the air spring according to the first embodiment, has lower plate 5 and laminated rubber 6.

Outer cylindrical member 1 has a plurality of raised portions 11. However, unlike the first embodiment, the outer cylindrical member may have a single raised portion 11. Even when the outer cylindrical member is provided with a plurality of raised portions 11, in contrast to the first embodiment, the plurality of raised portions 11 of the outer cylindrical member may be equal in height.

Figure 12:
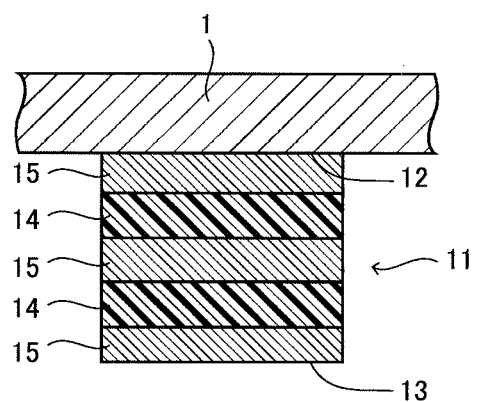
FIG. 12 is an enlarged cross section of the outer cylindrical member's raised portion in the second embodiment.

FIG. 12 is an enlarged cross section of the outer cylindrical member's raised portion 11 in the second embodiment. As shown in FIG. 12, the outer cylindrical member's raised portion 11 has flexible layer 14 and metal layer 15. Flexible layer 14 and metal layer 15 are stacked in layers. Flexible layer 14 and metal layer 15 may be plural in number.

Figure 13:
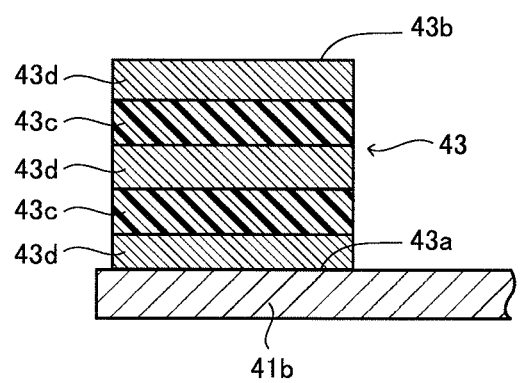
FIG. 13 is an enlarged cross section of the stopper's raised portion in the second embodiment.

FIG. 13 is an enlarged cross section of the stopper's raised portion 43 in the second embodiment. As shown in FIG. 13, the stopper's raised portion 43 has flexible layer 43c and metal layer 43d. Flexible layer 43c and metal layer 43d are stacked in layers. Flexible layer 43c and metal layer 43d may be plural in number.

The outer cylindrical member's raised portion 11 and the stopper's raised portion 43 configured as described above are restorable against deformation caused in a direction perpendicular to a direction from outer cylindrical member 1 toward inner cylindrical member 2. Note that at least one of the outer cylindrical member's raised portion 11 and the stopper's raised portion 43 having the above configuration suffices, and it is not necessary that the outer cylindrical member's raised portion 11 and the stopper's raised portion 43 both have the above configuration.

Hereinafter, an effect of the air spring in the second embodiment will be described as compared with a comparative example.

Figure 14:
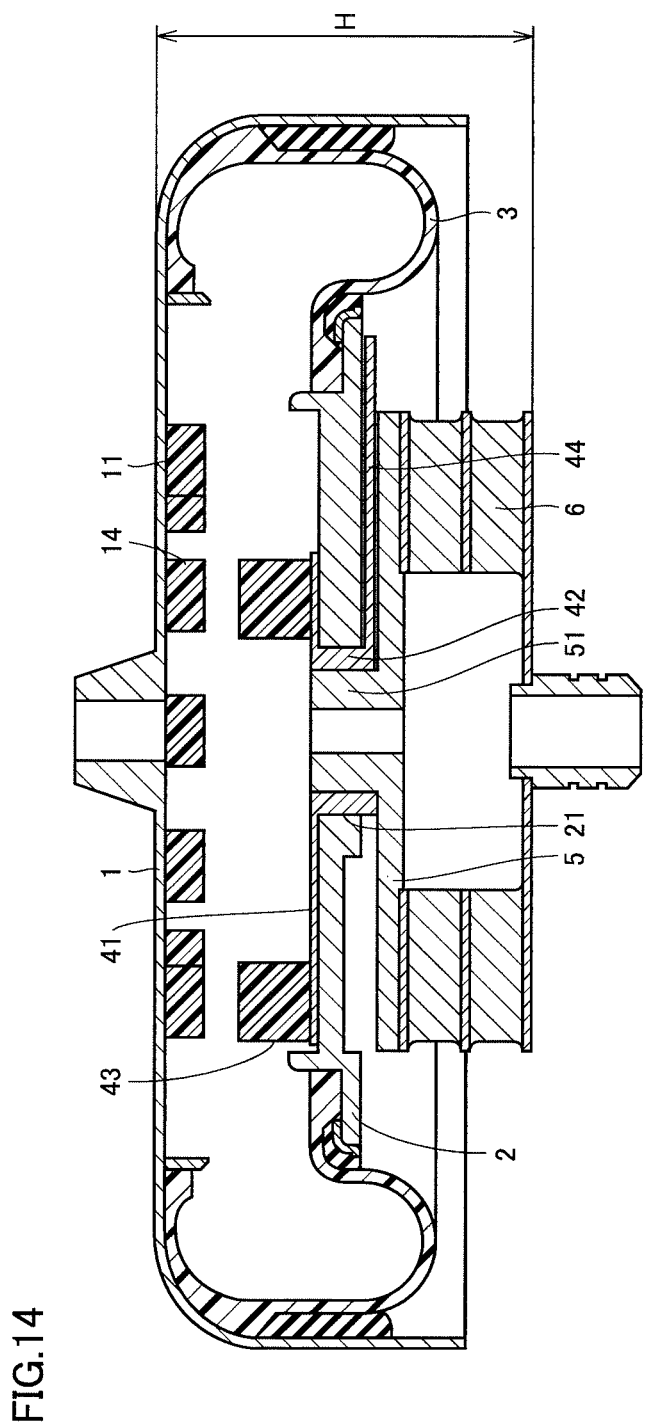
FIG. 14 is a cross section of an air spring according to a comparative example.

FIG. 14 is a cross section of an air spring according to the comparative example. As well as the air spring according to the second embodiment, the air spring according to the comparative example has outer cylindrical member 1, inner cylindrical member 2, diaphragm 3, and stopper 4. However, the air spring according to the comparative example is different from the air spring of the second embodiment in that the former has the outer cylindrical member's raised portion 11 entirely composed of flexible layer 14.

The air spring according to the comparative example having the outer cylindrical member's raised portion 11 entirely composed of flexible layer 14 has flexible layer 14 restorably against deformation caused in the direction perpendicular to the direction from outer cylindrical member 1 toward inner cylindrical member 2. However, the outer cylindrical member's raised portion 11 of the air spring according to the comparative example is entirely composed of flexible layer 14, and accordingly, it is low in rigidity against compressive deformation caused in the direction from top surface 13 toward bottom surface 12. Accordingly, the air spring according to the comparative example may insufficiently restrict movement of outer cylindrical member 1 toward inner cylindrical member 2.

In contrast, the outer cylindrical member's raised portion 11 of the air spring in the second embodiment has a structure where flexible layer 14 and metal layer 15 are stacked in layers, and it is thus high in rigidity against compressive deformation caused in the direction from top surface 13 toward bottom surface 12. Accordingly, the air spring in the second embodiment can sufficiently restrict movement of outer cylindrical member 1 toward inner cylindrical member 2 while suppressing damage to the outer cylindrical member's raised portion 11 and the stopper's raised portion 43 against deformation caused in the direction perpendicular to the direction from outer cylindrical member 1 toward inner cylindrical member 2.

Third Embodiment

Hereinafter, a configuration of a bogie according to a third embodiment will be described.

Figure 15:
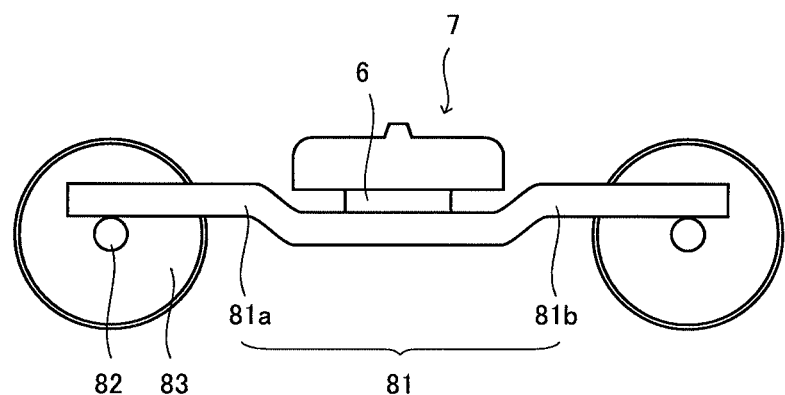
FIG. 15 is a side view of a bogie according to a third embodiment.

FIG. 15 is a side view of a bogie according to the third embodiment. As shown in FIG. 15, the bogie according to the third embodiment has an air spring 7, a bogie frame 81, an axle 82, and a vehicular wheel 83. Bogie frame 81 has a lateral beam 81a and a lateral beam 81b. Vehicular wheel 83 is attached to axle 82 at the opposite ends. Axle 82 is attached to bogie frame 81. More specifically, bogie frame 81 is attached to axle 82 when lateral beam 81a and lateral beam 81b are received and thus supported by axle 82 via an axle spring (not shown). Air spring 7 is an air spring according to the first or second embodiment. Air spring 7 is attached to bogie frame 81. More specifically, air spring 7 is attached on the side of laminated rubber 6 to bogie frame 81.

An effect of the bogie according to the third embodiment will be described hereinafter.

As has been described above, the bogie according to the third embodiment has air spring 7 which is the air spring according to the first embodiment or the second embodiment. The bogie according to the third embodiment can thus suppress damage to air spring 7 even when a vibration is experienced in a direction perpendicular to a direction from outer cylindrical member 1 to inner cylindrical member 2.

it should be understood that the embodiments disclosed herein have been described for the purpose of illustration only and in a non-restrictive manner in any respect. The scope of the present invention is defined by the terms of the claims, rather than the embodiments description above, and is intended to include any modifications within the meaning and scope equivalent to the terms of the claims.

REFERENCE SIGNS LIST

1: outer cylindrical member; 11, 11a, 11b, 11c, 11d: outer cylindrical member's raised portion; 12: bottom surface; 13: top surface; 14: flexible layer; 15: metal layer; 2: inner cylindrical member; 21: hole; 3: diaphragm; 4: stopper; 41: base; 41a: center portion; 41b: branch portion; 42: cylindrical portion; 43: stopper's raised portion; 43a: bottom surface; 43b: top surface; 43c: flexible layer; 43c: metal layer; 44: lever; 5: lower surface plate; 51: cylindrical axial portion; 6: laminated rubber; 7: air spring; 81: bogie frame; 82: axle; 83: vehicular wheel; F: force; H, H1, H2, h1, h2, h3, h4: height; S: stroke width.

The invention claimed is:

1. An air spring comprising:
an inner cylindrical member;
an outer cylindrical member provided on the inner cylindrical member;
a diaphragm coupled with the outer cylindrical member and the inner cylindrical member; and
a stopper provided rotatably with respect to a circumferential direction of the inner cylindrical member,
the stopper having a raised portion raised towards the outer cylindrical member and moving on the inner cylindrical member in the circumferential direction,
the outer cylindrical member having a plurality of raised portions raised toward the inner cylindrical member,
the plurality of raised portions of the outer cylindrical member having different heights, respectively,
at least one of the outer cylindrical member's raised portion and the stopper's raised portion being restorable against deformation caused in a direction perpendicular to a direction from the outer cylindrical member toward the inner cylindrical member,
wherein at least one of the outer cylindrical member's raised portion and the stopper's raised portion includes a flexible layer, a first metal layer and a second metal layer, and the first and second metal layers sandwich the flexible layer in a direction from the outer cylindrical member toward the inner cylindrical member.

2. The air spring according to claim 1, wherein the flexible layer is an elastomer.

3. The air spring according to claim 2, wherein the elastomer is rubber.

4. The air spring according to claim 1, wherein the plurality of raised portions of the outer cylindrical member are arranged in the circumferential direction in an order of the heights.

5. The air spring according to claim 4, wherein:
the stopper has a plurality of raised portions;
the outer cylindrical member has a plurality of sets of raised portions; and
the sets and the stopper's raised portions are equal in number.

6. A bogie comprising the air spring according to claim 1.

7. An air spring comprising:
an inner cylindrical member;
an outer cylindrical member provided on the inner cylindrical member;
a diaphragm coupled with the outer cylindrical member and the inner cylindrical member; and
a stopper provided rotatably with respect to a circumferential direction of the inner cylindrical member,
the stopper having a raised portion raised towards the outer cylindrical member and moving on the inner cylindrical member in the circumferential direction,
the outer cylindrical member having a plurality of raised portions raised toward the inner cylindrical member,
at least one of the outer cylindrical member's raised portion and the stopper's raised portion having a flexible layer, a first metal layer and a second metal layer,
the first and second metal layers sandwiching the flexible layer in a direction from the outer cylindrical member toward the inner cylindrical member.

8. A bogie comprising the air spring according to claim 7.

* * * * *